United States Patent [19]
Hirota et al.

[11] Patent Number: 5,524,591
[45] Date of Patent: Jun. 11, 1996

[54] FUEL SUPPLY AMOUNT CONTROL SYSTEM FOR INTERNAL COMBUSTION ENGINES

[75] Inventors: Toshiaki Hirota; Sachito Fujimoto; Toru Kitamura; Masami Watanabe, all of Wako, Japan

[73] Assignee: Honda Giken Kogyo Kabushiki Kaisha, Tokyo, Japan

[21] Appl. No.: 331,746

[22] Filed: Oct. 31, 1994

[30] Foreign Application Priority Data

Nov. 1, 1993 [JP] Japan ..................... 5-296049

[51] Int. Cl.$^6$ ..................... F02D 41/04; F02M 25/07
[52] U.S. Cl. ..................... 123/478; 123/571
[58] Field of Search ..................... 123/478, 480, 123/486, 571

[56] References Cited

U.S. PATENT DOCUMENTS

| | | | |
|---|---|---|---|
| 4,409,948 | 10/1983 | Hasegawa et al. | 123/571 |
| 4,448,177 | 5/1984 | Hasegawa et al. | 123/571 |
| 4,757,683 | 7/1988 | Kawanabe et al. | 123/571 |
| 4,782,810 | 11/1988 | Shimoda et al. | 123/571 |
| 4,848,303 | 7/1989 | Fujimoto et al. | 123/571 |
| 5,241,943 | 9/1993 | Miyashita et al. | 123/571 |
| 5,261,370 | 11/1993 | Ogawa et al. | 123/571 |
| 5,383,126 | 1/1995 | Ogawa et al. | 123/571 |

FOREIGN PATENT DOCUMENTS

| | | |
|---|---|---|
| 59-192838 | 11/1984 | Japan . |
| 60-169641 | 9/1985 | Japan . |

Primary Examiner—Willis R. Wolfe
Attorney, Agent, or Firm—Nikaido, Marmelstein, Murray & Oram

[57] ABSTRACT

A fuel supply amount control system for an internal combustion engine having exhaust gas recirculation passage extending between the exhaust passage and the intake passage, and an exhaust gas recirculation valve arranged across the exhaust gas recirculation passage, for recirculating part of exhaust gases emitted from the engine to the intake passage, has an ECU which detects an actual valve lift amount of the exhaust gas recirculation valve, determines a desired valve lift amount of the exhaust gas recirculation valve, based on operating conditions of the engine, and controls the exhaust gas recirculation valve, based on determined the desired valve lift amount and the detected actual valve lift amount, when the engine is in a predetermined operating region where conditions for executing exhaust gas recirculation control are satisfied. A basic fuel supply amount is calculated based on operating conditions of the engine, and a correction coefficient for correcting the basic fuel supply amount, is set based on the actual valve lift amount and the desired valve lift amount, when the engine is in the predetermined operating region. The basic fuel amount is corrected based on the correction coefficient.

6 Claims, 13 Drawing Sheets

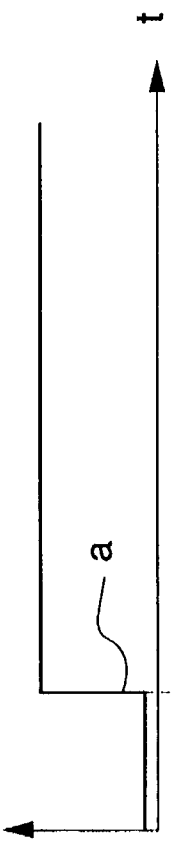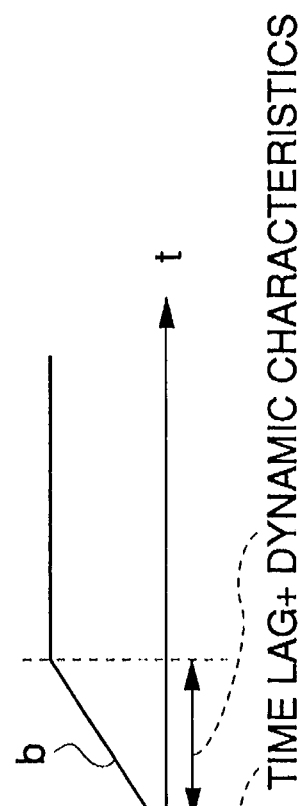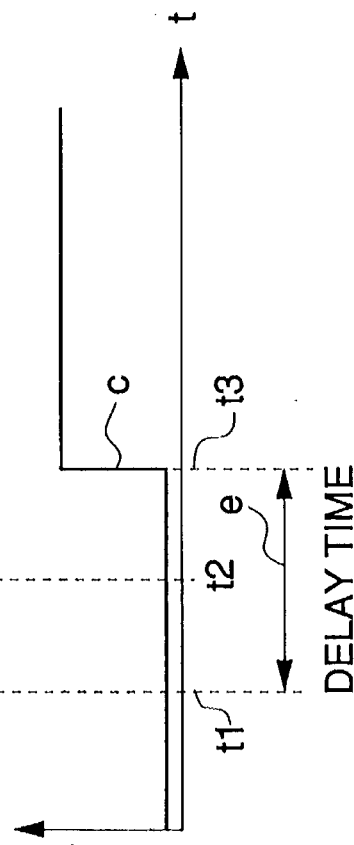

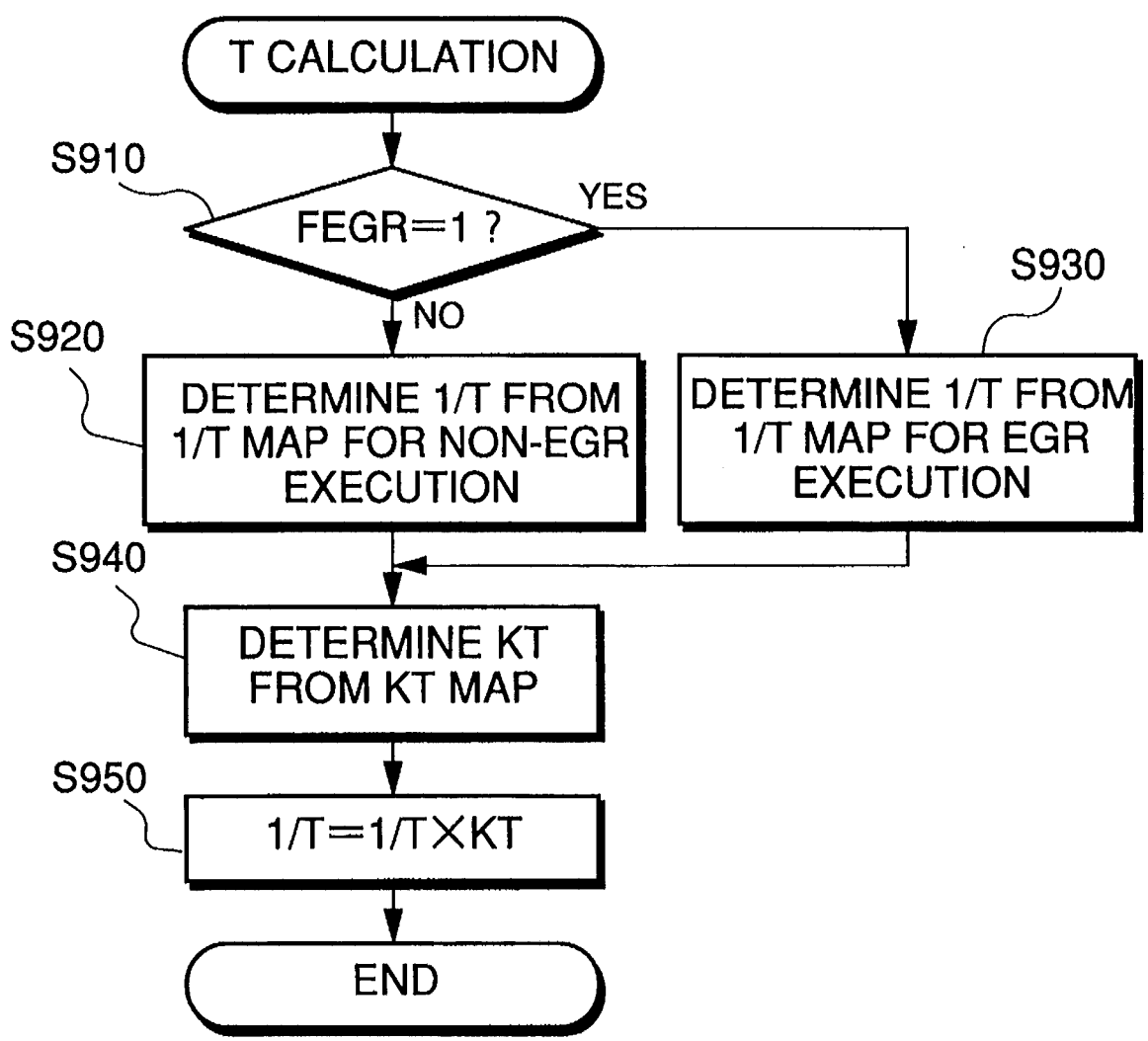

FUEL SUPPLY AMOUNT CONTROL SYSTEM FOR INTERNAL COMBUSTION ENGINES

BACKGROUND OF THE INVENTION

1. Field of the Invention

This invention relates to a fuel supply amount control system for internal combustion engines which are equipped with exhaust gas recirculation control systems.

2. Prior Art

Conventionally, exhaust gas recirculation control is widely employed in internal combustion engines in order to decrease NOx in exhaust gases emitted from the engine and curtail the fuel consumption. In an internal combustion engine employing an electronic control fuel injection system (hereinafter referred to as "the ECU"), when the engine is in a predetermined operating region where predetermined conditions for execution of exhaust gas recirculation control are satisfied, the ECU supplies to an exhaust gas recirculation control valve (hereinafter referred to as the "EGR valve"), a control signal based on a required exhaust gas recirculation rate to operate the EGR valve, whereby part of exhaust gases are recirculated from the exhaust system to the intake system. A method of decreasing the fuel supply amount by an amount corresponding to an amount of exhaust gases recirculated during execution of exhaust gas recirculation control, has been disclosed, for example, by Japanese Provisional Patent (Kokai) No. 60-169641, wherein a basic value of a fuel supply amount to be supplied to the engine is corrected based on a correction coefficient KEGR according to the exhaust gas recirculation rate.

The EGR valve, especially a negative pressure-responsive type EGR valve operates to open with a time lag relative to the timing of supply of the control signal from the ECU, the time lag being variable depending upon operating conditions of the engine. On the other hand, an electromagnetic EGR valve as another type EGR valve operates to open after a fixed time lag relative to the timing of supply of the control signal from the ECU.

To eliminate inconveniences caused by these time lags, Japanese Provisional Patent Publication (Kokai) No. 60-169641 mentioned above has further proposed a method of delaying timing of changing the correction coefficient KEGR by a predetermined delay time so as to compensate for the time lag from the time the control signal is generated by the ECU to the time recirculation of exhaust gases is actually started by opening of the EGR valve. Further, this delay time is variable depending upon operating conditions of the engine, when the negative pressure-responsive type EGR valve is employed. Therefore, a plurality of values of the delay time are provided for respective engine operating regions. Further, Japanese Provisional Patent Publication (Kokai) No. 59-192838 discloses a method of reading the value of the correction coefficient KEGR from a KEGR map based on engine operating parameters, and progressively varying the read value of the correction coefficient KEGR with the lapse of time, before it is applied for correction of the basic value of fuel supply amount.

However, the valve-opening behavior of the EGR valve responsive to the control signal from the ECU is complicate, as will be described below. Therefore, it is difficult to set the value of the correction coefficient KEGR to a value appropriate to the actual valve opening of the EGR valve during valve-opening operation thereof, merely by changing the value of the correction coefficient KEGR after the predetermined delay time, or applying the correction coefficient KEGR which progressively varies at a fixed gradient with the lapse of time. FIG. 1B shows a change in the actual valve opening (valve lift) of the EGR valve with the lapse of time when the EGR valve is of the negative pressure-responsive type. According to the method of Japanese Provisional Patent Publication (Kokai) No. 60-169641 mentioned above, after a control signal a is supplied to the EGR valve at a time point t1 (see FIG. 1A), the EGR valve starts to open at a time point t2 a delay time d corresponding to the time lag has elapsed from the time point t1. Thereafter, the EGR valve progressively opens at a gradient b according to the dynamic characteristics of the EGR valve. On the other hand, correction of the fuel injection is started at a time point t3 a delay time e elapses after the delay time d is estimated to have elapsed after the time point t2 (see FIG. 1C). However, the EGR valve performs its valving operation in response to negative pressure developed in the intake system of the engine, and therefore it is difficult to accurately determine the delay time d which is set after the generation of the control signal a from the ECU. In addition, the valve-opening gradient c of the EGR valve progressively varies according to the dynamic characteristics inherent in the EGR valve. Particularly, when the EGR valve is feedback controlled such that the valve lift (valve opening) thereof becomes equal to a desired value, even the delay time d itself cannot be determined.

Further, the above-mentioned delay time e should include a time lag of fuel transfer through an exhaust gas recirculation passage and a time lag of detection of pressure within the intake pipe by an intake pipe pressure sensor, which is a parameter for determining the basic value of the correction coefficient KEGR. Therefore, it is difficult to make the fuel supply amount correspond to the actual valve opening of the EGR valve, based on the above-mentioned method of controlling the fuel supply amount by simply applying the correction coefficient KEGR after the predetermined delay time e, or the method of controlling the fuel supply amount by simply varying the correction coefficient KEGR at the fixed gradient with the lapse of time. As a result, the ratio between an amount of air containing exhaust gases recirculated, which is actually supplied to the combustion chamber, and the actual injected fuel amount deviates from a desired value, i.e. the air-fuel ratio of an air-fuel mixture supplied to the engine deviates from the desired value, resulting in degraded exhaust emission characteristics of the engine and unfavorably spoiled drivability of the engine.

On the other hand, in the case of the negative pressure-responsive type EGR valve, the delay time d can be determined. However, similarly to the negative pressure-responsive type EGR valve, the electromotive EGR valve has such complicated dynamic characteristics that the calculated fuel supply amount cannot correctly reflect the amount of exhaust gases recirculated, only by applying the correction coefficient KEGR after the predetermined delay time e. As a result, the air-fuel ratio of the air-fuel mixture supplied to the engine deviates from the desired value, to thereby unfavorably cause similar inconveniences to those mentioned above.

SUMMARY OF THE INVENTION

It is the object of the invention to provide a fuel supply amount control system for internal combustion engines, which is capable of calculating a fuel supply amount without being affected by a time lag in the valve opening operation of the EGR valve and dynamic characteristics of the EGR valve, to thereby achieve improved exhaust emission characteristics and drivability of the engine.

To attain the above object, the present invention provides a fuel supply amount control system for an internal combustion engine having an exhaust passage, an intake passage, an exhaust gas recirculation passage extending between the exhaust passage and the intake passage, and exhaust gas recirculation valve means arranged across the exhaust gas recirculation passage, for recirculating part of exhaust gases emitted from the engine to the intake passage, comprising:

valve lift-detecting means for detecting an actual valve lift amount of the exhaust gas recirculation valve means;

operating condition-detecting means for detecting operating conditions of the engine;

desired valve lift-determining means for determining a desired valve lift amount of the exhaust gas recirculation valve means, based on operating conditions of the engine detected by the operating condition-detecting means;

exhaust gas recirculation valve control means for controlling the exhaust gas recirculation valve means, based on the desired valve lift amount determined by the desired valve lift-determining means and the actual valve lift amount detected by the valve lift-detecting means, when the engine is in a predetermined operating region where conditions for executing exhaust gas recirculation control are satisfied;

basic fuel injection-calculating means for calculating a basic fuel supply amount, based on operating conditions of the engine detected by the operating condition-detecting means;

correction coefficient-setting means for setting a correction coefficient for correcting the basic fuel supply amount, based on the actual valve lift amount and the desired valve lift amount, when the engine is in the predetermined operating region; and basic fuel amount-correcting means for correcting the basic fuel amount, based on the correction coefficient.

Preferably, the correction coefficient-setting means sets the correction coefficient, based on a degree to which the actual valve lift amount approaches the desired valve.

Advantageously, the correction coefficient-setting means sets the correction coefficient, based on a ratio of the actual valve lift amount to the desired valve lift amount.

Also preferably, the correction coefficient-setting means delays correction of the correction coefficient based on the degree to which the actual valve lift amount approaches the desired valve lift amount by a predetermined time period.

More preferably, the correction coefficient-setting means sets the predetermined time period, based on operating conditions of the engine.

Advantageously, the correction coefficient-setting means sets the predetermined time period, based on the rotational speed of the engine.

The above and other objects, features, and advantages of the invention will be more apparent from the following detailed description taken in conjunction with the accompanying drawings.

BRIEF DESCRIPTION OF THE DRAWINGS

FIGS. 1A to 1C collectively form a timing chart showing the relationship in timing between a control signal from an ECU, an actual valve opening (valve lift) of an EGR valve, and changeover of a fuel supply amount, according to a conventional fuel supply amount-calculating method applied to an EGR system employing a negative pressure-responsive type EGR valve: wherein FIG. 1A shows a change in the control signal from the ECU;

FIG. 1B shows a change in the actual valve lift in response to the control signal; and FIG. 1C shows timing of changeover of the fuel supply amount;

FIGS. 9A to 9G collectively form a timing chart showing the relationship in timing between the valve lift command valve LCMD, the actual valve lift amount LACT, a ratio LACT/LCMD, a KEGR map value, the correction coefficient KEGR(n), a correction coefficient KEGR(n–$\tau$), and an air-fuel ratio A/F during valving operation of an EGR valve for exhaust gas recirculation: wherein FIG. 9A shows a change in the desired EGR valve lift amount LCMD;

FIG. 9B shows a change in the actual valve lift amount LACT in response to the control signal from the ECU;

FIG. 9C shows a change in the ratio LACT/LCMD;

FIG. 9D shows a change in the KEGR map;

FIG. 9E shows a change in the correction coefficient KEGR(n);

FIG. 9F shows a change in the correction coefficient KEGR(n–$\tau$); and

FIG. 9G shows a change in the air-fuel ratio A/F;

FIG. 15 is a flowchart showing a program for calculating a transfer delay time constant T.

DETAILED DESCRIPTION

The invention will now be described in detail with reference to the drawings showing embodiments thereof.

Figure 2:
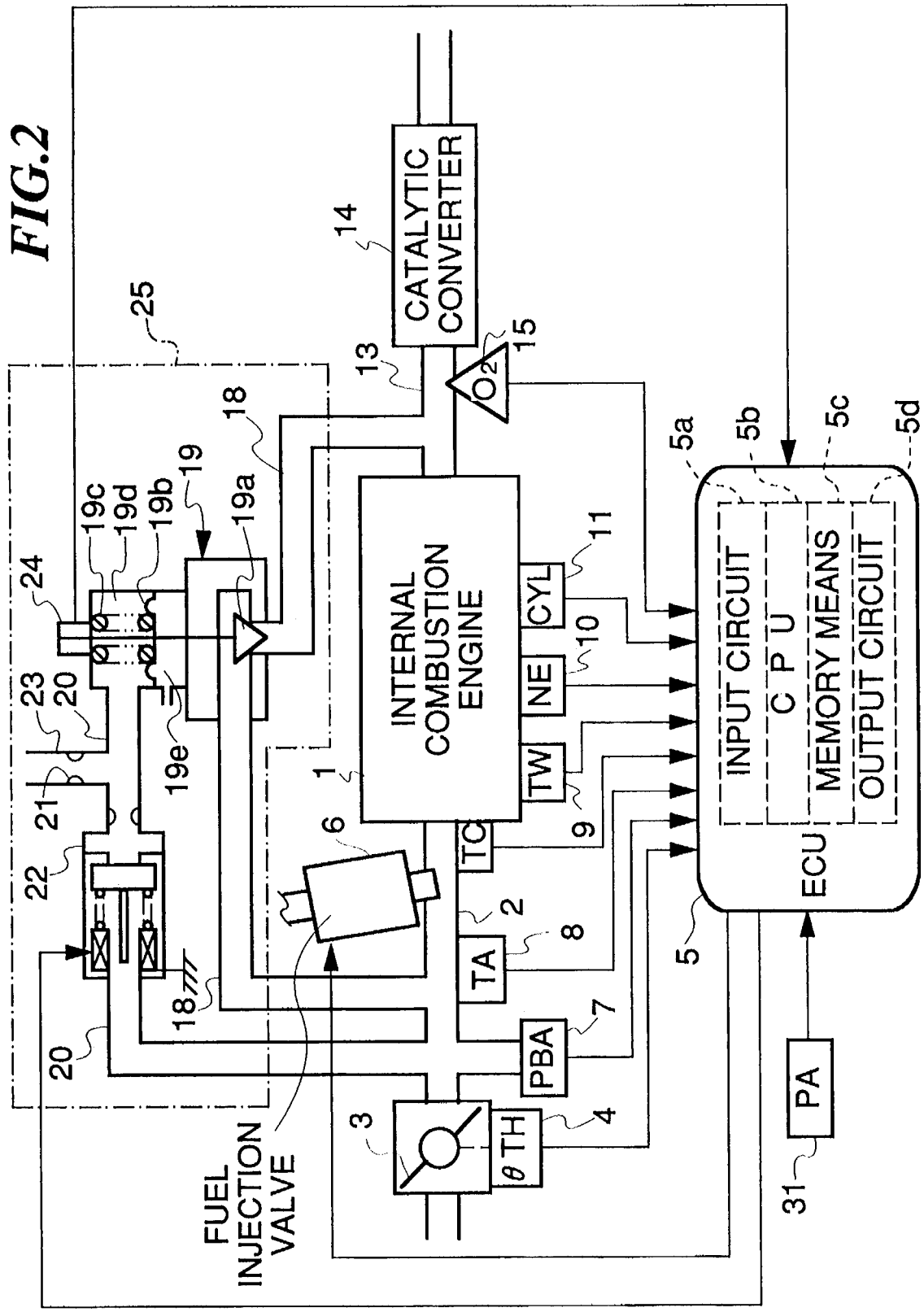
FIG. 2 is a schematic diagram showing the whole arrangement of an internal combustion engine and a fuel supply amount control system therefor, according to an embodiment of the invention.

Referring first to FIG. 2, there is illustrated the whole arrangement of an internal combustion engine and a fuel supply amount control system therefor, according to an embodiment of the invention. In the figure, reference numeral 1 designates an internal combustion engine (hereinafter referred to as "the engine") having e.g. four cylinders. In an intake pipe 2 of the engine 1, there is arranged a throttle valve 3, to which is connected a throttle valve opening (θTH) sensor 4 for sensing the valve opening and supplying an electric signal indicative of the sensed throttle valve opening to an electronic control unit (hereinafter referred to as "the ECU") 5.

Fuel injection valves 6, only one of which is shown, are each provided for each cylinder and arranged in the intake pipe 2 between the engine 1 and the throttle valve 3 at a location slightly upstream of an intake valve, not shown. The fuel injection valves 6 are connected to a fuel pump, not shown, and electrically connected to the ECU 5 to have their fuel injection periods (valve opening periods) controlled by signals therefrom.

On the other hand, an intake pipe absolute pressure (PBA) sensor 7 is provided in communication with the interior of the intake pipe 2 at a location immediately downstream of the throttle valve 3, for sensing absolute pressure (PBA) within the intake pipe 2, and is electrically connected to the ECU 5 for supplying an electric signal indicative of the sensed absolute pressure PBA to the ECU 5. Further, an intake air temperature (TA) sensor 8 is mounted in the wall of the intake pipe at a location downstream of the PBA sensor 7, for supplying an electric signal indicative of the sensed intake air temperature TA to the ECU 5.

An engine coolant temperature (TW) sensor 9, which may be formed of a thermistor or the like, is mounted in a coolant-filled cylinder block of the engine, for supplying an electric signal indicative of the sensed engine coolant temperature TW to the ECU 5. An engine rotational speed (NE) sensor 10 and a cylinder discriminating signal (CYL) sensor 11 are arranged in facing relation to a camshaft or a crankshaft of the engine 1, neither of which is shown. The NE sensor 10 generates a pulse as a TDC signal pulse at each of predetermined crank angles whenever the crankshaft rotates through 180 degrees, while the CYL sensor 11 generates a pulse as a CYL signal pulse at a predetermined crank angle of a particular cylinder of the engine, both of the pulses being supplied to the ECU 5.

A catalytic converter (three-way catalyst) 14 is arranged in an exhaust pipe 13 extending from the cylinder block of the engine 1, for purifying noxious components present in the exhaust gases, such as HC, CO, and NOx. Further, an oxygen concentration sensor (hereinafter referred to as "the O2 sensor") 15 is arranged as an air-fuel ratio sensor in the exhaust pipe 13 at a location upstream of the catalytic converter 14, for supplying an electric signal indicative of the sensed oxygen concentration in exhaust gases to the ECU 5.

Further connected to the ECU 5 are an atmospheric pressure sensor 31 for detecting atmospheric pressure PA, and a wall temperature (TC) sensor 32, which is mounted in a wall portion of the intake pipe 2 in the vicinity of an intake port, not shown, and detects a wall temperature TC of the intake pipe 2, of which output signals indicative of the sensed values are supplied to the ECU 5. The wall temperature TC may be estimated from the intake pipe absolute pressure PBA and the engine rotational speed NE.

Next, an exhaust gas recirculation system 25 will be described hereinbelow. In the exhaust gas recirculation system 25, an exhaust gas recirculation passage 18 extends between the intake pipe 2 and the exhaust pipe 13, across which is arranged an EGR valve (exhaust gas recirculation valve) 19. The EGR valve 19 is a negative pressure-responsive type valve, and is comprised of a valve element 19a disposed to open and close the passage 18, a diaphragm 19b, which is connected to the valve element 19a to operate in response to negative pressure or vacuum guided from the intake pipe 2 by an electromagnetic valve 22, referred to hereinafter, and a spring 19c biasing the diaphragm 19b in the direction to close the valve. A negative pressure chamber 19d is defined by the diaphragm 19b, to which is connected a communication passage 20. The negative pressure chamber 19d is constructed such that negative pressure within the intake pipe 2 is introduced thereto via a normally closed electromagnetic valve 22 arranged across the communication passage 20. An atmospheric pressure chamber 19e is also defined by the diagram 19b, which communicates with the atmosphere. Further connected to the communication passage 20 is an atmosphere communication passage 23 at a location downstream of the electromagnetic valve 22, for guiding atmospheric pressure into the communication passage 20 via a restriction 21 provided in the communication passage 23, and then into the negative pressure chamber 19d. The electromagnetic valve 22 is electrically connected to the ECU 5 to have its operation controlled by a driving signal supplied therefrom, to thereby control the lifting operation and lifting speed of the valve element 19a of the EGR valve 19.

The EGR valve 19 is provided with a valve lift sensor 24 for detecting the operating position (valve lift) of the valve element 19a of the valve 19, of which an output signal indicative of the sensed valve lift is supplied to the ECU 5.

The ECU 5 is comprised of an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c formed of a ROM storing various operational programs which are executed by the CPU 5b, and various maps and tables, referred to hereinafter, and a RAM for storing results of calculations therefrom, etc., and an output circuit 5d which outputs driving signals to the fuel injection valves 6, and the electromagnetic valve 22.

The CPU 5b operates in response to the above-mentioned signals from the sensors to determine operating conditions in which the engine 1 is operating, such as an air-fuel ratio feedback control region in which air-fuel ratio feedback control is carried out in response to oxygen concentration in exhaust gases, and open-loop control regions, and calculates, based upon the determined engine operating conditions, a valve opening period or a fuel injection period Tout over which the fuel injection valves 6 are to be opened, in synchronism with generation of TDC signal pulses, by the use of the following equation (1):

$$Tout = Ti \times KEGR \times Ktotal \qquad (1)$$

where Ti represents a basic value of the fuel injection period TOUT, which is determined according to the engine rotational speed NE and the intake pipe absolute pressure PBA. A Ti map is stored in the memory means 5c for determining the Ti value.

KEGR represents a correction coefficient based on exhaust gas recirculation, calculation of which value will be described hereinafter. Ktotal represents another correction coefficient, which is set according to engine operating parameters to such a value as optimize engine operating characteristics, such as fuel consumption and engine accelerability. The correction coefficient Ktotal is a product obtained by multiplying various correction coefficients, such as a fuel increasing coefficient KWOT which is applied when the engine is operating in a high load condition, a leaning coefficient KLS which is applied when the engine is operating in a predetermined mixture-leaning region, an engine coolant temperature-dependent correction coefficient TW based on the detected engine coolant temperature TW, an atmospheric pressure-dependent correction coefficient KPA based on the detected atmospheric pressure PA, an intake air temperature-dependent correction coefficient KTA based on the detected intake air temperature TA, and an air-fuel ratio correction coefficient KO2 based on the output signal from the O2 sensor 15. For example, the correction coefficient KO2 is calculated based on the output signal from the O2 sensor 15, to such a value that the air-fuel ratio detected by the O2 sensor 15 becomes equal to a desired value when the engine 1 is operating in the air-fuel ratio feedback control region, while it is set to predetermined values corresponding to the respective open-loop control regions of the engine when the engine 1 is in the open-loop control regions.

Exhaust gas recirculation control

The CPU 5b operates in response to the engine operating parameter signals, etc. from the various sensors to determine operating conditions in which the engine 1 is operating, and sets a valve lift command value LCMD for the EGR valve 19 according to the intake pipe absolute pressure PBA and the engine rotational speed NE. The CPU 5b controls the electromagnetic valve 22 so as to minimize or make zero the difference between the thus set valve lift command value LCMD and the actual valve lift amount LACT of the EGR valve 19 detected by the lift sensor 24.

The CPU 5b outputs driving signals for driving the fuel injection valves 6 and the electromagnetic valve 22, based on the thus obtained calculation results, via the output circuit 5d.

Figure 3:
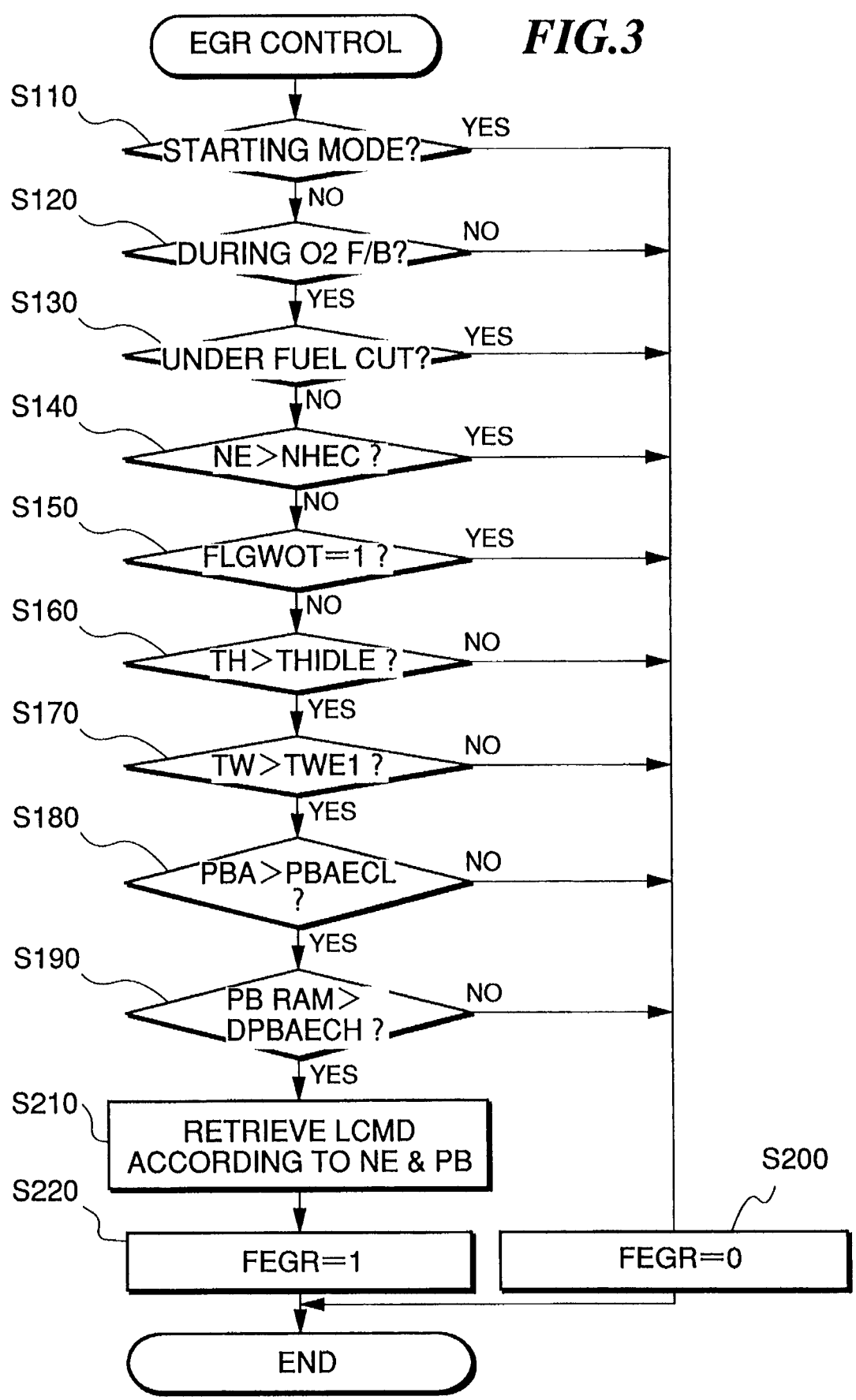
FIG. 3 is a flowchart showing a program for executing exhaust gas recirculation control.

FIG. 3 shows a program for executing exhaust gas recirculation control, which is executed in synchronism with generation of each TDC signal pulse from the NE sensor 10.

First, it is determined whether or not the engine 1 is in a predetermined operating region where preconditions for executing exhaust gas recirculation control are satisfied. If any of the preconditions for executing exhaust gas recirculation is not satisfied, more specifically, if it is determined at a step S110 that the engine 1 is in a starting mode, at a step S120 that the engine 1 is not operating in the air-fuel ratio feedback control region for executing air-fuel ratio feedback control based on the O2 sensor, at a step S130 that the engine 1 is under fuel cut due to deceleration, at a step S140 that the engine rotational speed NE is higher than a predetermined engine rotational speed NHEC, at a step S150 that a flag FLAGWOT, which is set according to another routine, is set to a value "1", i.e. the throttle valve is fully opened when large engine output power is required, at a step S160 that the throttle valve lift value TH is lower than a predetermined lift value THIDLE, i.e. the engine is idling, at a step S170 that the engine temperature, i.e. the engine coolant temperature TW is lower than a predetermined temperature TWE1 at the start of the engine such as in cold weather, at a step S180 that the intake pipe absolute pressure PBA is higher than a predetermined pressure value PBAE, i.e. load on the engine is high, or at a step S190 that pressure within the intake pipe has changed by a predetermined pressure value DPBAECH or more, i.e. the difference in pressure between upstream and downstream sides of the throttle valve 3 is smaller than a predetermined value, e.g. when the vehicle with the engine installed therein travels at a high altitude, a flag FEGR is set to "0" to inhibit execution of exhaust gas recirculation at a step S200. In short, if the engine is operating in a region where execution of exhaust gas recirculation incurs poor startability or drivability of the engine, the exhaust gas recirculation is inhibited. If the above preconditions for executing exhaust gas recirculation control are all satisfied, the lift command value LCMD for the valve element 19a of the EGR valve 19 is retrieved from a basic valve lift map, based on the engine rotational speed NE and the intake pipe absolute pressure PBA, at a step S210. The basic valve lift map is set such that map values are provided for respective combinations of predetermined values of the intake pipe absolute pressure PBA and the engine rotational speed NE, and a map value of the lift command value LCMD is read according to the detected PBA value and the NE value. The read lift command value LCMD is used to determine a recirculation rate of exhaust gases. After reading the valve lift command value LCMD, the flag FEGR is set to "1" at a step S220 to permit execution of exhaust gas recirculation, followed by terminating the present routine.

EGR lift amount feedback control

Figure 4:
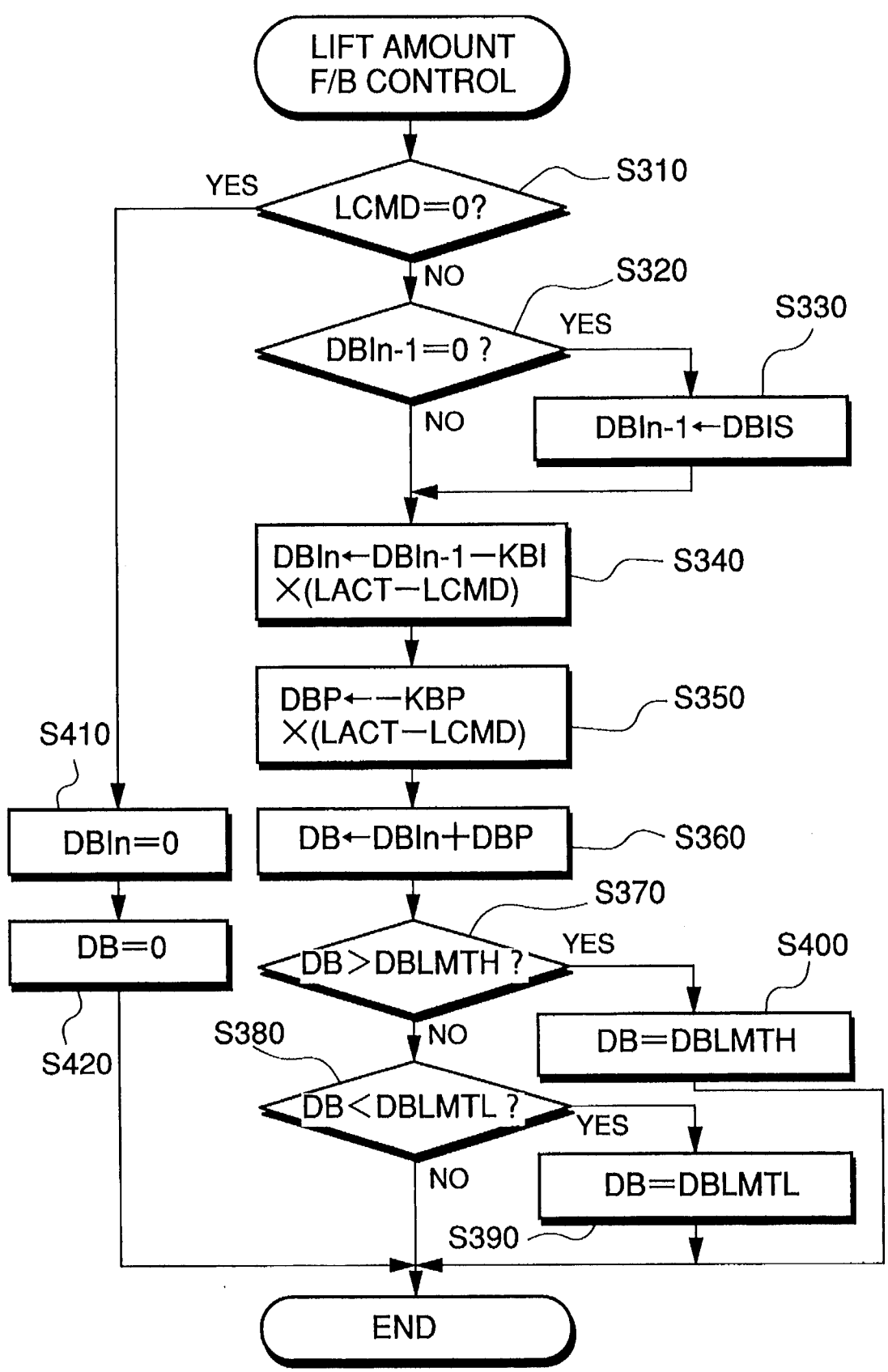
FIG. 4 is a flowchart showing a program for controlling EGR valve lift in a feedback manner.

Next, description will be made of a routine for controlling the lift of the EGR valve in a feedback manner, with reference to FIG. 4. The present routine duty-controls the lift of the valve element 19a in a feedback manner responsive to the difference between the valve lift command value LCMD obtained according to the above described EGR control routine as a desired value and the actual valve lift LACT. This routine is executed at predetermined time intervals (e.g. 40 msec) measured by a timer.

First, at a step S310, it is determined whether or not the valve lift command value LCMD is equal to "0". If it is determined that the valve lift command value LCMD is not equal to "0", then it is determined at a step S320 whether or not the last value of an integral control duty ratio DBI(n−1) is equal to "0". If it is determined that the last value of the integral control duty ratio DBI(n−1) is equal to "0", then the program proceeds to a step S330, wherein the last value of the integral control duty ratio DBI(n−1) is set to an initial value DBIS (e.g. 50%). On the other hand, if the last value of the integral control duty ratio DBI(n−1) is not equal to "0", i.e. the duty control was started in the last loop at the step S320, or if the step S330 has been carried out, a present value of the integral control duty ratio DBI(n) is calculated at a step S340, by the use of the following equation (2):

$$DIB(n)=DBI(n-1)-KBI \times (LACT-LCMD) \qquad (2)$$

where LACT represents the output value from the lift sensor 24, and KBI represents an integral control constant.

Then, at a step S350, a proportional control duty ratio DBP is calculated by the use of the following equation (3):

$$DBP=KBP \times (LACT-LCMD) \qquad (3)$$

where KBP represents a proportional control constant.

At a step S360, a solenoid control duty ratio DB is calculated by adding together the DBIn and DBP values calculated by the use of the equations (2) and (3). The solenoid control duty ratio DB is applied as a duty control signal to duty-control the electromagnetic valve 22 by the ECU 5. Next, limit checking of the calculated solenoid control duty ratio DB is executed. More specifically, it is determined whether or not the DB value exceeds an upper limit value DBLMTH or is smaller than a lower limit value DBLMTL, at steps S370 and S380, respectively. If the DB value exceeds the upper limit value DBLMTH or is smaller than the lower limit value DBLMTL, the solenoid control duty ratio DB is set to the upper limit value DBLMTH or the lower limit value DBLMTL, at a step S390 or S400, respectively, followed by terminating the routine.

On the other hand, if it is determined at the step S310 that the valve lift command value LCMD is equal to "0", the present value of the integral control duty ratio DBI(n) is set to "0" at a step S410, and the proportional control duty ratio DBP is set to "0" at a step S420, followed by terminating the present routine.

Calculation of fuel supply amount Tout

Figure 5:
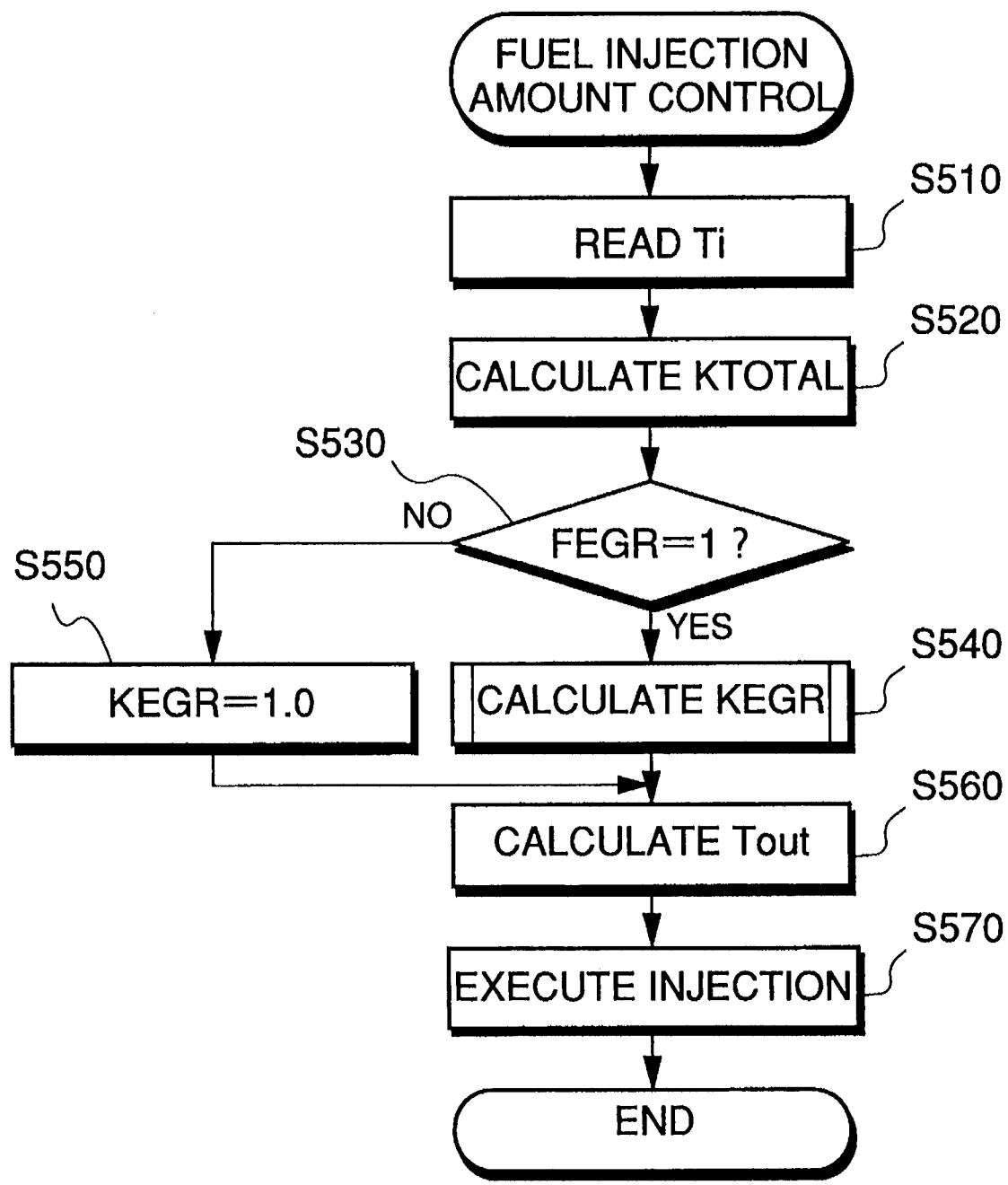
FIG. 5 is a flowchart showing a program for calculating a fuel supply amount.

Then, a routine for calculating the fuel supply amount will be described. FIG. 5 shows the routine for calculating the fuel supply amount, which is executed in synchronism with generation of each TDC signal pulse. First, at a step S510, the basic value Ti of the fuel supply amount Tout is retrieved from the Ti map, based on the engine rotational speed NE and the intake pipe absolute pressure PBA. Then, at a step S520 the correction coefficient Ktotal is calculated based on the various engine operating parameters. At a step S530, it is determined whether or not the flag FEGR for permitting execution of exhaust gas recirculation when set to "1", is set to "1". If the flag FEGR is set to "1", the program proceeds to a step S540, wherein the correction coefficient KEGR is calculated, according to a subroutine, described hereinafter, whereas if the flag FEGR is not set to "1", the correction coefficient KEGR is set to a value of 1.0 at a step S550. Then at a step S560, the fuel supply amount Tout is calculated by multiplying the basic fuel amount value Ti by the correction coefficients Ktotal and KEGR obtained at the steps S520 and S540 or S550, respectively, by the use of the equation (1). Then, the driving signal based on the thus calculated fuel supply amount Tout is supplied to the fuel injection valve 6 to energize the same for fuel injection at a step S570, followed by terminating the present routine.

Calculation of correction coefficient KEGR

Figure 6:
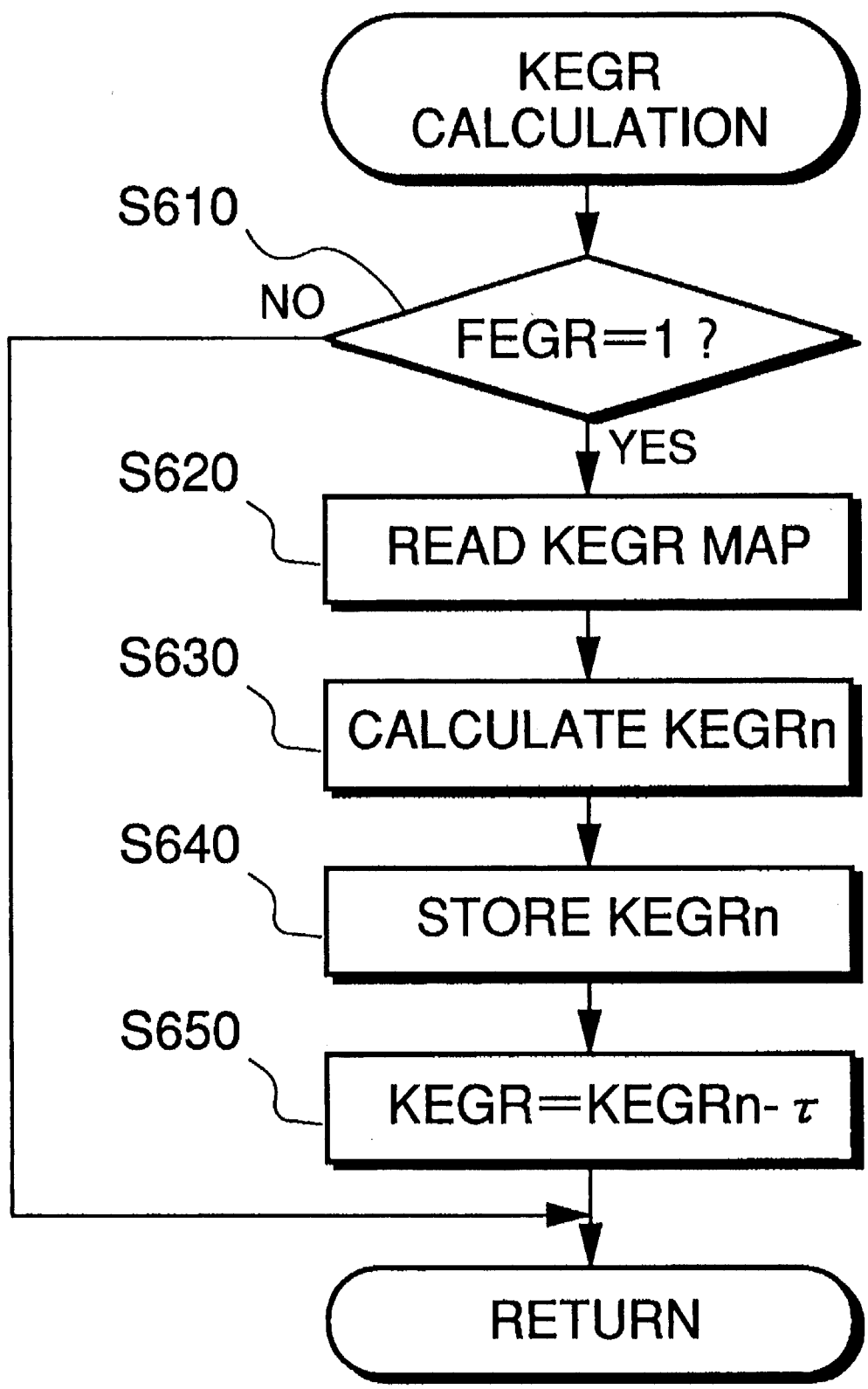
FIG. 6 is a flowchart showing a subroutine for calculating a correction coefficient KEGR, which is executed by the FIG. 5 program.

Next, the subroutine for calculating the correction coefficient KEGR will be described hereinbelow, with reference to FIG. 6. This subroutine is executed in synchronism with generation of each TDC signal pulse. First, at a step S610 it is determined whether or not the flag FEGR has been set to a value "1" to permit execution of exhaust gas recirculation. If the flag FEGR has been set to "1" to permit execution of exhaust gas recirculation, a KEGR map is retrieved at a step S620, based on the engine rotational speed NE and the intake pipe absolute pressure PBA, to determine a basic correction coefficient KEGRMAP. The basic correction coefficient KEGRMAP is applied as it is within the engine is in a steady operating condition, such as a cruising condition of the vehicle, and which is set to a value within a range of 0 to 1.0 during execution of exhaust gas recirculation. Further, based on the thus determined basic correction coefficient KEGRMAP and a ratio LACT/LCMD of the aforesaid valve lift command value LCMD to the actual valve lift amount EACT of the EGR valve 19 detected by the lift sensor 24, a present value of correction coefficient KEGR(n) to be applied exhaust gas recirculation in the present loop is calculated at a step S630, by the use of the following equation (4):

$$KEGR(n) = 1.0 - [(1.0 - KEGRMAP) \times LACT/LCMD] \quad (4)$$

Figure 7:
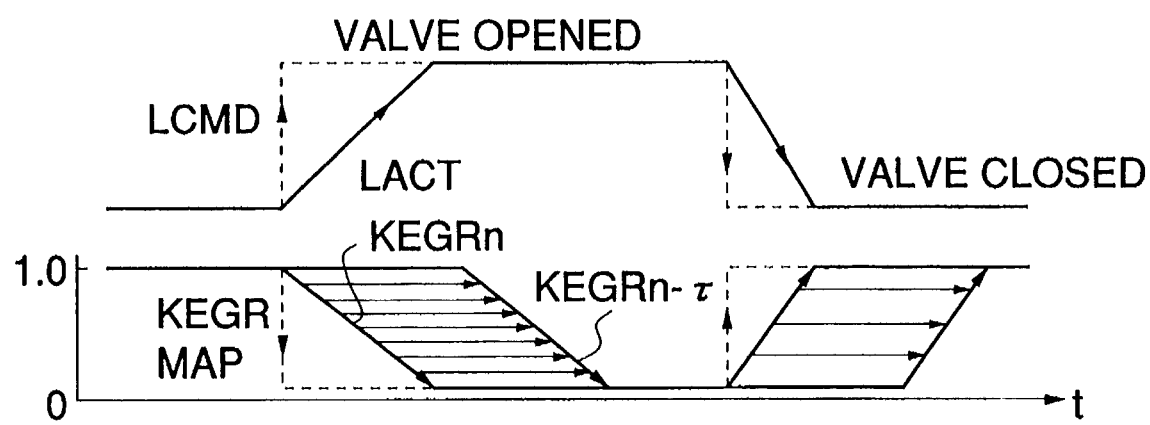
FIG. 7 is a timing chart showing the relationship in timing between a valve lift command value LCMD, an actual valve lift amount LACT, and a calculated correction coefficient KEGR(n)

FIG. 7 shows the relationship in timing between the valve lift command value LCMD of the EGR valve 19, the actual valve lift amount LACT, and the correction coefficient KEGR(n) calculated by the use of the equation (4). The actual valve lift amount LACT detected by the lift sensor 24 progressively increases with a time delay relative to the valve lift command value LCMD of the control signal from the ECU 5, due to dynamic characteristics of the EGR valve 19, etc. The correction coefficient KEGR(n), which is calculated by multiplying a value (1.0−KEGRMAP) equivalent to an amount of exhaust gases to be recirculated in a steady operating condition of the engine by the ratio LACT/LCMD, progressively decreases correspondingly to the increase in the actual valve lift amount LACT. Thus, the correction coefficient KEGR(n) reflects an amount of exhaust gases being recirculated during a transient state of the EGR valve, i.e. during opening motion thereof.

Figure 8:
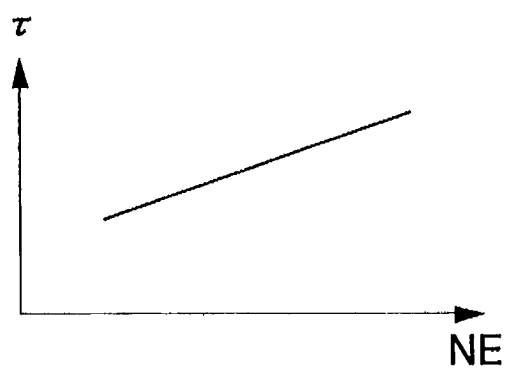
FIG. 8 is a graph showing the relationship between the number of times $\tau$ of generation of TDC signal pulses and engine rotational speed NE.

Referring again to FIG. 6, the thus calculated correction coefficient KEGR(n) is stored into a ring memory at a step S640. The ring memory contains buffer areas corresponding in number (e.g. 15) to a time lag (the number of times $\tau$), referred to hereinafter. Whenever a counter finishes counting 15 TDC signal pulses corresponding in number to the time lag (the number of times $\tau$), the next calculated value of the correction coefficient KEGR(n) is stored into the buffer area where the first calculated value of the correction coefficient KEGR(n) is stored. The time lag (the number of times $\tau$) indicates a time period from the time the EGR valve 19 has started its valving opening motion to the time exhaust gases are recirculated to the intake passage (the time the recirculated exhaust gases affect the output from the PBA sensor 7). The time lag (the number of times $\tau$) has been empirically determined, which is changed according to operating conditions of the engine, such as the engine rotational speed NE. FIG. 8 shows the relationship between the number of times $\tau$ and the engine rotational speed NE. As is apparent from the figure, the higher the engine rotational speed NE, the shorter the repetition period of generation of TDC signal pulses, i.e. the greater the number of times $\tau$.

Thus, the number of times $\tau$ is determined from a table based on the FIG. 8 graph, according to the engine rotational speed NE, and a correction coefficient value KEGR(n−$\tau$) calculated the number of times $\tau$ before the present loop (n) is set to a value of the correction coefficient KEGR to be applied in executing exhaust gas recirculation, i.e. substituted into the equation (1) to determine the present value of the fuel supply amount Tout, at a step S650 (see FIG. 7).

As described above in detail, according to the present embodiment, the actual valve lift amount LACT is detected directly by the lift sensor 24, and it is therefore possible to prevent a deviation of the air-fuel ratio from the desired value due to the time lag which is uncertain and with which the EGR valve 19 operates in response to the valve lift command value LCMD of the control signal from the ECU 5. Further, the value (1.0−KEGRMAP) corresponding to the amount of exhaust gases to be recirculated in a steady operating condition of the engine is multiplied by the ratio LACT/LCMD, to thereby control the fuel supply amount to a value appropriate to the amount of exhaust gases being recirculated during a transient state of the EGR valve. As a result, the correction coefficient KEGR can be corrected according to the dynamic characteristics of the EGR valve 19. Moreover, the present value of the correction coefficient KEGR, which corrects the fuel supply amount Tout, is set to a value KEGR(n−$\tau$) of the correction coefficient KEGR calculated the number of times $\tau$ before the present loop, so that the influence of the time lag form the time the EGR valve 19 has started its valve opening motion to the time the recirculated exhaust gases affect the output from the PBA sensor 7 can be eliminated.

Figure 9:
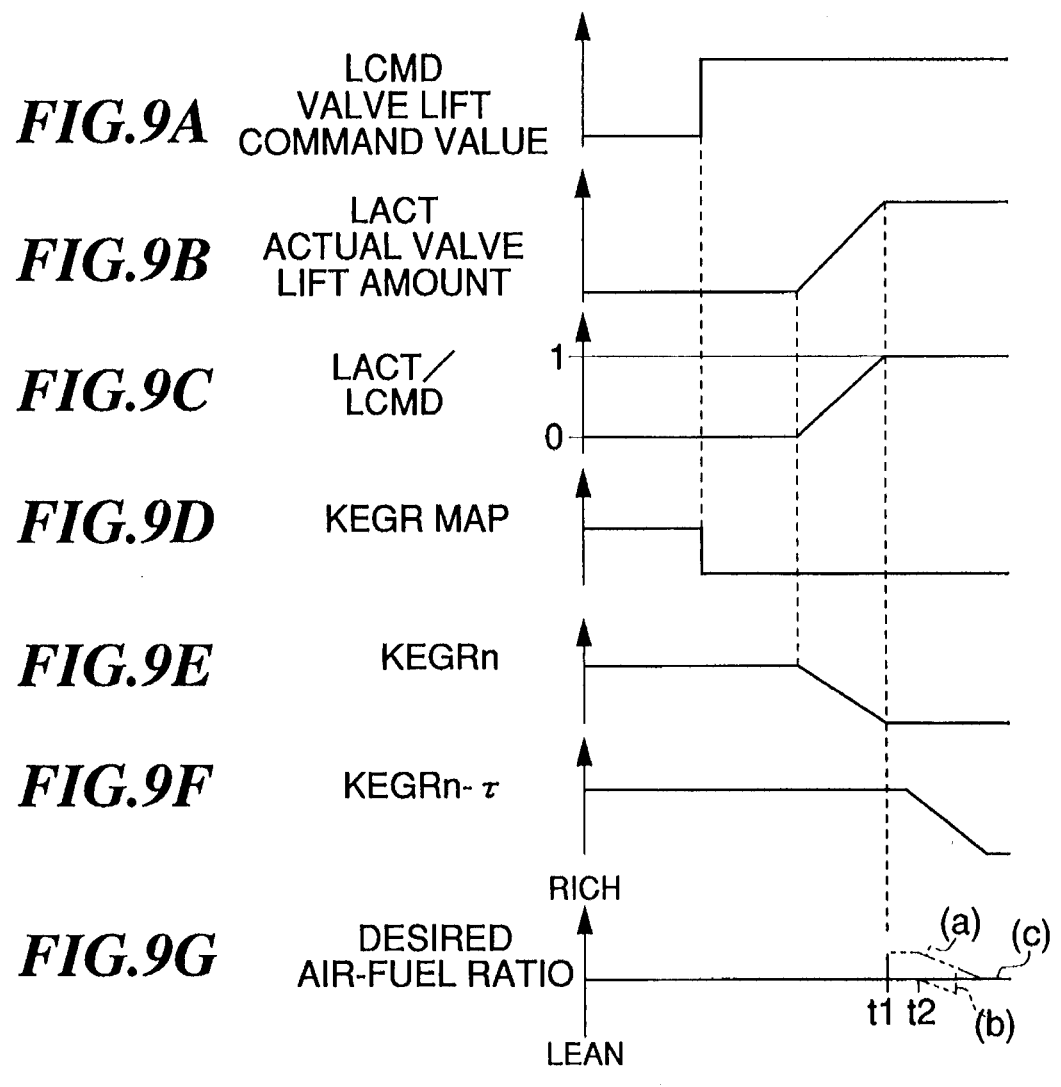

FIGS. 9A to 9G show the relationship in timing between the desired EGR valve lift amount LCMD, the actual valve lift amount LACT, the ratio LACT/LCMD, the KEGR map, the correction coefficient KEGR(n), the correction coefficient KEGR(n−τ), and the air-fuel ratio A/F during the EGR valve operation for exhaust gas recirculation. In FIG. 9G, the two-dot dash line (a) and the broken line (b) indicate changes in the air-fuel ratio A/F obtained when the correction coefficient KEGR is changed to the basic correction coefficient KEGRMAP at time points t1 and t2, respectively. The solid line (c) indicates a change in the air-fuel ratio A/F obtained when the correction coefficient KEGR is controlled by the program for controlling the fuel supply amount according to the present embodiment. As is apparent from the figure, even during the operation of the EGR valve a suitable amount of fuel to be injected can be calculated according to the actual valve lift amount LACT, resulting in improved exhaust emission characteristics and improved drivability of the engine.

The fuel injection control according to the present embodiment is not limited to the start of exhaust gas recirculation insofar as the preconditions for executing exhaust gas recirculation control are satisfied, but may be applied even when the exhaust gas recirculation rate is changed so that a new value of the correction coefficient KEGR is set.

Second embodiment

Next, a second embodiment of the invention will be described hereinbelow. The second embodiment is distinguished from the first embodiment described above, only in that correction of fuel transfer delay is incorporated in calculating the fuel supply amount. Except this, the fuel supply amount control system according to the second embodiment is identical in construction and arrangement with the first embodiment. Elements and parts of the second embodiment corresponding to those of the first embodiment are designated by identical reference numerals, description thereof being omitted.

Description will now be made of the correction of fuel transfer delay.

First, the principle of the correction of fuel transfer delay will be described with reference to FIGS. 10 to 12.

Figure 10:
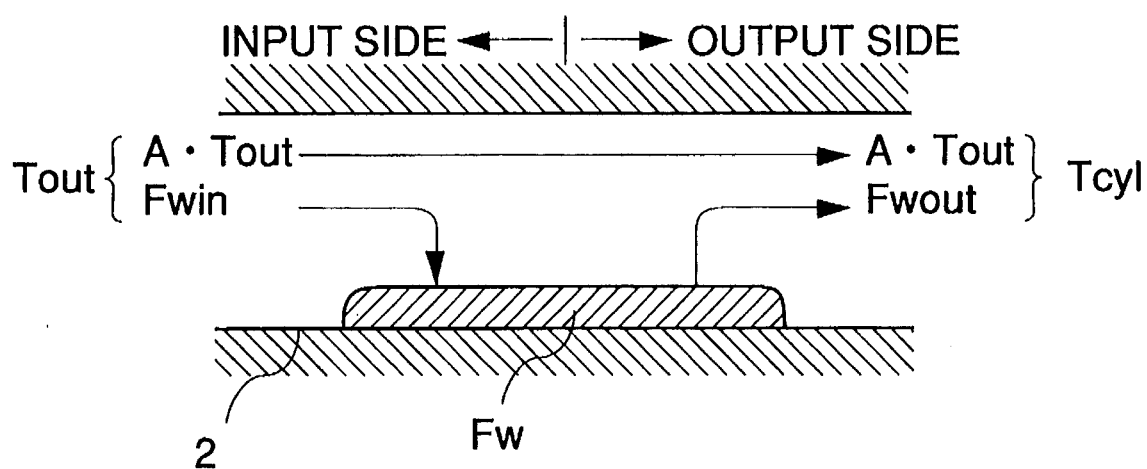
FIG. 10 is a schematic diagram showing the relationship between a fuel supply amount TOUT and a required fuel amount Tcyl, according to a second embodiment of the invention.

FIG. 10 shows the relationship between the fuel supply amount Tout and a required fuel amount Tcyl.

In the figure, Tout represents a fuel supply amount injected from the fuel injection valve 6 into the intake pipe 2 in an operating cycle of the engine. Out of the injected fuel supply amount Tout, an amount equal to A×Tout (A: direct supply ratio) is directly supplied to the cylinder without adhering to a wall surface of the intake port, and the remaining amount of the injected fuel is added to an amount Fw of fuel which adhered to the wall surface up to the last operating cycle of the engine, as a new additional amount Fwin of adherent fuel. The direct supply ratio A is a ratio of a fuel amount directly drawn into a combustion chamber in an operating cycle of the engine to the whole fuel amount injected in the same operating cycle, and set in the relationship of 0<A<1.

The sum of the above-mentioned product (A×Tout) and an amount Fwout of adherent fuel which is carried off the amount Fw of fuel adhering to the wall surface is set as the required fuel amount Tcyl.

Next, a method of correcting the fuel transfer delay will be described.

This method is based upon the concept that the carried-off amount Fwout is carried off with a predetermined delay time relative to supply of the additional amount Fwin. This concept is expressed as a first-order delay model, wherein the delay degree of the carried-off amount Fwout is represented by a delay coefficient (time constant) T.

As described hereinabove, the required fuel amount Tcyl is expressed by the following equation (5):

$$Tcyl = A \times Tout + Fwout \tag{5}$$

Therefore, the fuel supply amount Tout and the additional amount Fwin can be expressed by the following equations (6) and (7), respectively:

$$Tout = (Tcyl - Fwout)/A \tag{6}$$

$$Fwin = (1-A) \times Tout \tag{7}$$

Since the carried-off amount Fwout is equal to the first-order delay model of the additional amount Fwin, a value of the carried-off amount Fwout in the present loop can be expressed by the following equation (8):

$$Fwout(n) = Fwout(n-1) + (Fwin - Fwout)/T \tag{8}$$

According to the equation (8), the value of the carried-off amount Fwout(n) in the present loop is larger than the last value Fwout(n−1) thereof, by a value 1/T times as large as the difference between the additional amount Fwin and the carried-off amount Fwout. In short, whenever the same calculation as the equation (8) is carried out every operating cycle of the engine, the carried-off amount Fwout becomes closer to the additional amount Fwin by 1/T times as large as the difference.

Figure 11:
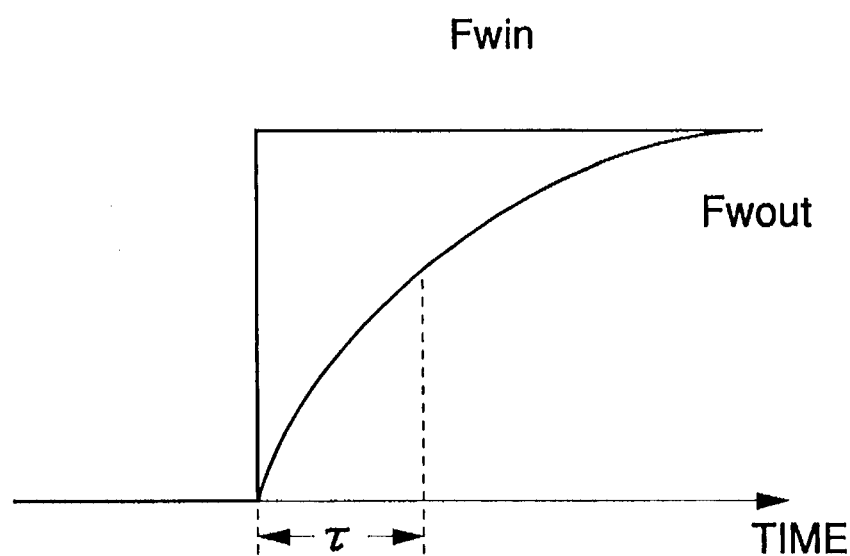
FIG. 11 is a graph showing a change in a new additional amount Fwin of adherent fuel and a change in a carried-off amount Fwout of adherent fuel with the lapse of time.

For example, if the fuel supply amount Tout is stepwise increased, the additional amount Fwin also stepwise increases as shown in FIG. 11 provided that the direct supply ratio A remains constant. On the other hand, the carried-off amount Fwout progressively increases to the additional amount Fwin, at a rate based on the time constant T. The time constant T represents a time period required for the carried-off amount Fwout to reach 63.2% of the whole carried-off amount after the carried-off amount Fwout starts to increase. The T value is determined based on operation conditions of the engine, as described hereinbelow.

Thus, the fuel supply amount Tout can be calculated by the use of the equations (6), (7) and (8).

Figure 12:
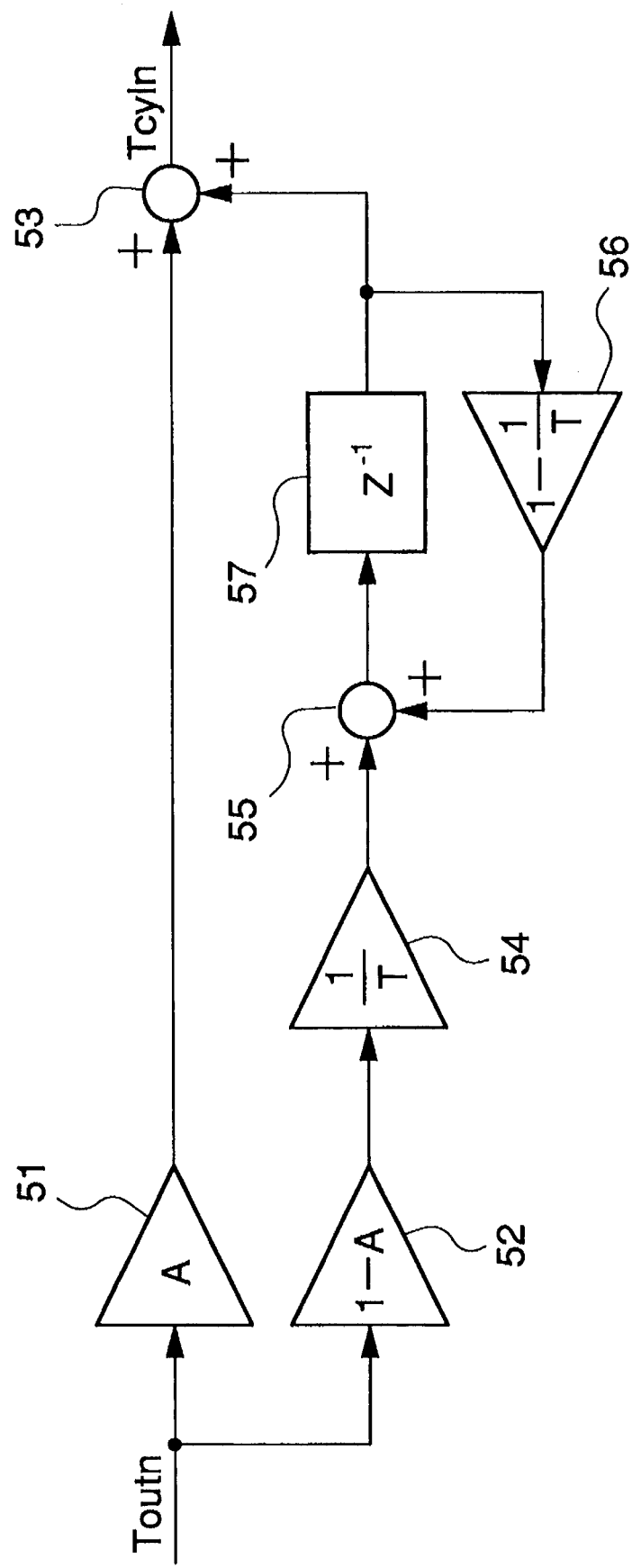
FIG. 12 is a schematic diagram showing a physical model circuit modeled on fuel transfer delay correction according to the invention.

FIG. 12 schematically shows a physical model circuit modeled on the fuel transfer delay correction according to the first method (hereinafter referred to as "the A-T method").

In the figure, a fuel supply amount Tout(n) injected from the fuel injection valve 6 in one operating cycle (n) of the engine is multiplied by the value A (direct supply ratio) at a multiplier 51, while it is multiplied by the (1−A) value at a multiplier 52. An output from the multiplier 51, i.e. a value (An×Toutn) is supplied to an adder 53, where the carried-off amount Fwout(n) in the present loop is added to the (An× Toutn) value, into the required fuel amount Tcyl(n) to be applied in the present loop.

On the other hand, an output from the multiplier 2, i.e. the additional amount Fwin(n) in the present loop, which is the amount Fwin(n)=(1−An)×Tout(n) obtained by the equation (7). The Fwin(n) value is multiplied by 1/T at a multiplier 54, which supplies the resulting output to an adder 55, wherein an output from a multiplier 56 is added to the output from the multiplier 54. The output from the multiplier 56 is the product of a value (1−1/Tn) and the carried-off amount Fwout(n) from the adder 53.

The carried-off amount Fwout(n) supplied to the adder 53 is an output from a cycle delay circuit 57 which delays an input thereof by one cycle (1 TDC), and therefore an input supplied to the cycle delay circuit 57 is a carried-off amount Fwout(n+1) to be applied in the next cycle.

Therefore, the output from the adder 55, i.e. the carried-off amount Fwout(n+1) supplied to the cycle delay circuit 57 is expressed by the following equation (9):

$$Fwout(n+1) = Fwin(n)/T + (1-1/Tn) \times Fwout(n) = Fwout(n) + (Fwin(n) - Fwout(n))/T \quad (9)$$

where Fwin(n)=(1−An)×Tout(n). This equation (9) corresponds to the equation (8).

Generally, the basic fuel supply amount Ti is determined based on the engine rotational speed NE and engine load parameters represented by the intake pipe absolute pressure PBA. The required fuel amount Tcyl is obtained by multiplying the basic fuel supply amount Ti by the correction coefficient Ktotal. During execution of exhaust gas recirculation, the required fuel amount Tcyl is further multiplied by the correction coefficient KEGR for exhaust gas recirculation, into a product Tcyl×KEGR. The thus obtained product value is set to the required fuel amount for the cylinder.

Thus, the following basic equation (10) can be formulated, which contemplates the fuel transfer delay. According to the present embodiment, the fuel supply amount Tout is calculated by the use of the equation (10), as well as the aforesaid equations (7) and (8):

$$Tout = (Tcyl \times KEGR - Fwout)/A \quad (10)$$

Figure 13:
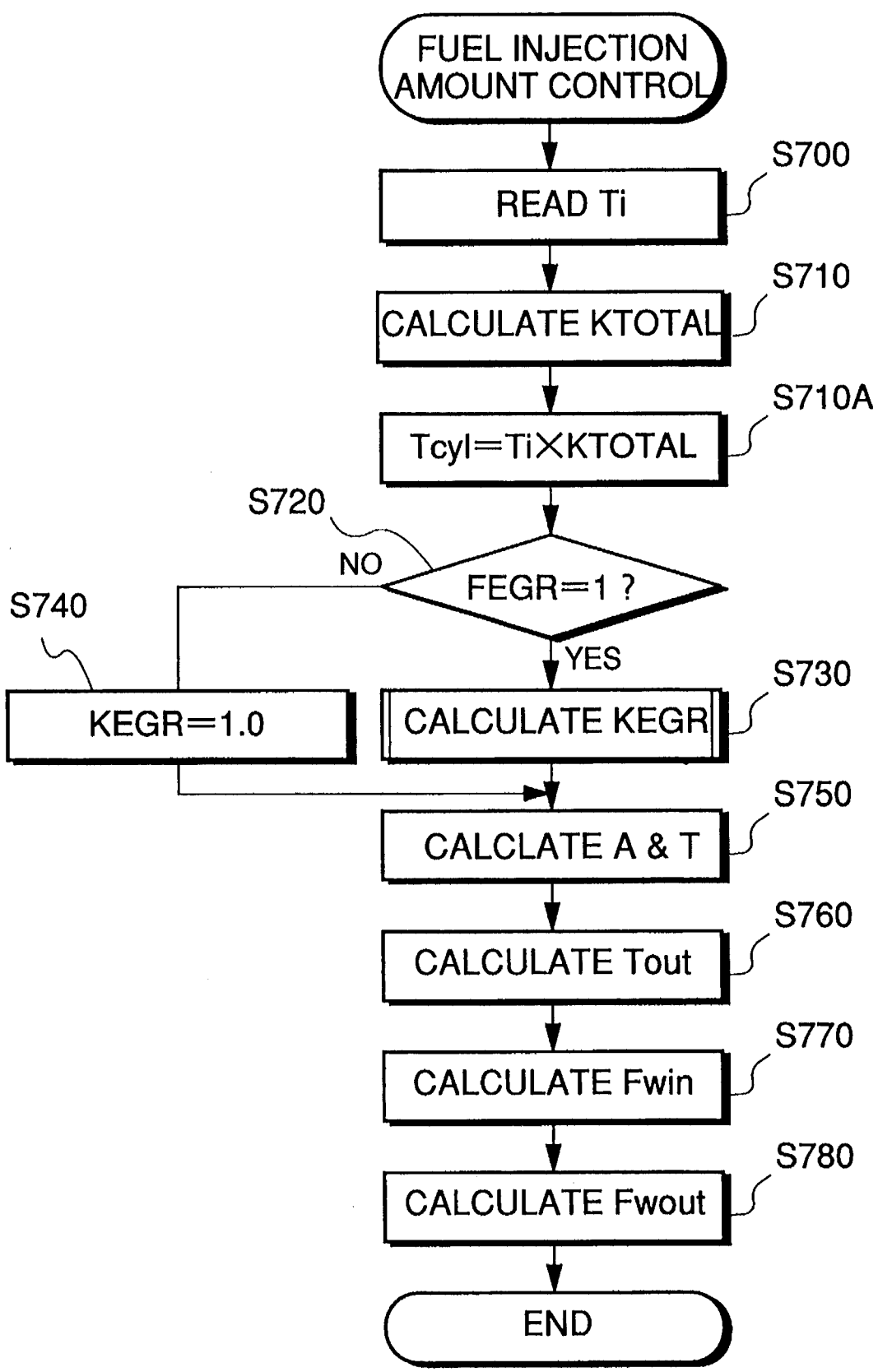
FIG. 13 is a flowchart showing a program for controlling a fuel supply amount.

FIG. 13 shows a routine for controlling the fuel supply amount, according to the second embodiment. This routine is executed in synchronism with generation of each TDC signal pulse. First, at a step S700, the basic fuel supply amount Ti is determined by retrieving the Ti map, based on the engine rotational speed NE and the intake pipe absolute pressure PBA, as described above. At a step S710, the correction coefficient Ktotal is calculated similarly to the step S520 in FIG. 5. Multiplication of the basic fuel supply amount Ti by the correction coefficient Ktotal determines the required fuel amount Tcyl to be supplied to the cylinder at a step S710A. Then, it is determined at a step S720 whether or not the flag FEGR for permitting execution of exhaust gas recirculation has been set to "1". If the flag FEGR has been set to "1", the program proceeds to a step S730, wherein the correction coefficient KEGR is calculated. If the flag FEGR has not been set to "1", the correction coefficient KEGR is set to a value of 1.0 at a step S740. The subroutine for calculating the correction coefficient KEGR, executed at the step S730, is identical with the subroutine of FIG. 6, description thereof being omitted.

Then, the direct supply ratio A and the transfer delay time constant T are calculated based on the intake pipe absolute pressure PBA, the engine rotational speed NE, the intake pipe wall temperature TC, and permission/inhibition of exhaust gas recirculation, according to a method, described hereinafter, at a step S750.

Then, the fuel supply amount Tout(n) in the present loop is calculated based on the thus obtained required fuel amount Tcyl, correction coefficient KEGR, direct supply ratio A, and transfer delay time constant T, by the use of the above equation (10), at a step S760. When the fuel supply amount Tout(n) to be supplied in the present loop and the direct supply ratio A are calculated, the additional amount Fwin and the carried-off amount Fwout(n) are calculated by the equations (7) and (8) at steps S770 and S780, respectively, which will be applied to a calculation of a fuel supply amount Tout(n+1) to be supplied in the next loop, followed by terminating the routine.

In the present embodiment, the fuel supply amount Tout is calculated based on the direct supply ratio A and the transfer delay time constant T as parameters representing adhering fuel characteristics, however, this is not limitative. Alternatively, the fuel supply amount Tout may be calculated based on the direct supply ratio A and an evaporation ratio (carry-off ratio) B from the adherent fuel amount Fw as parameters representing the adhering fuel characteristics.

Calculation of direct supply ratio A

Figure 14:
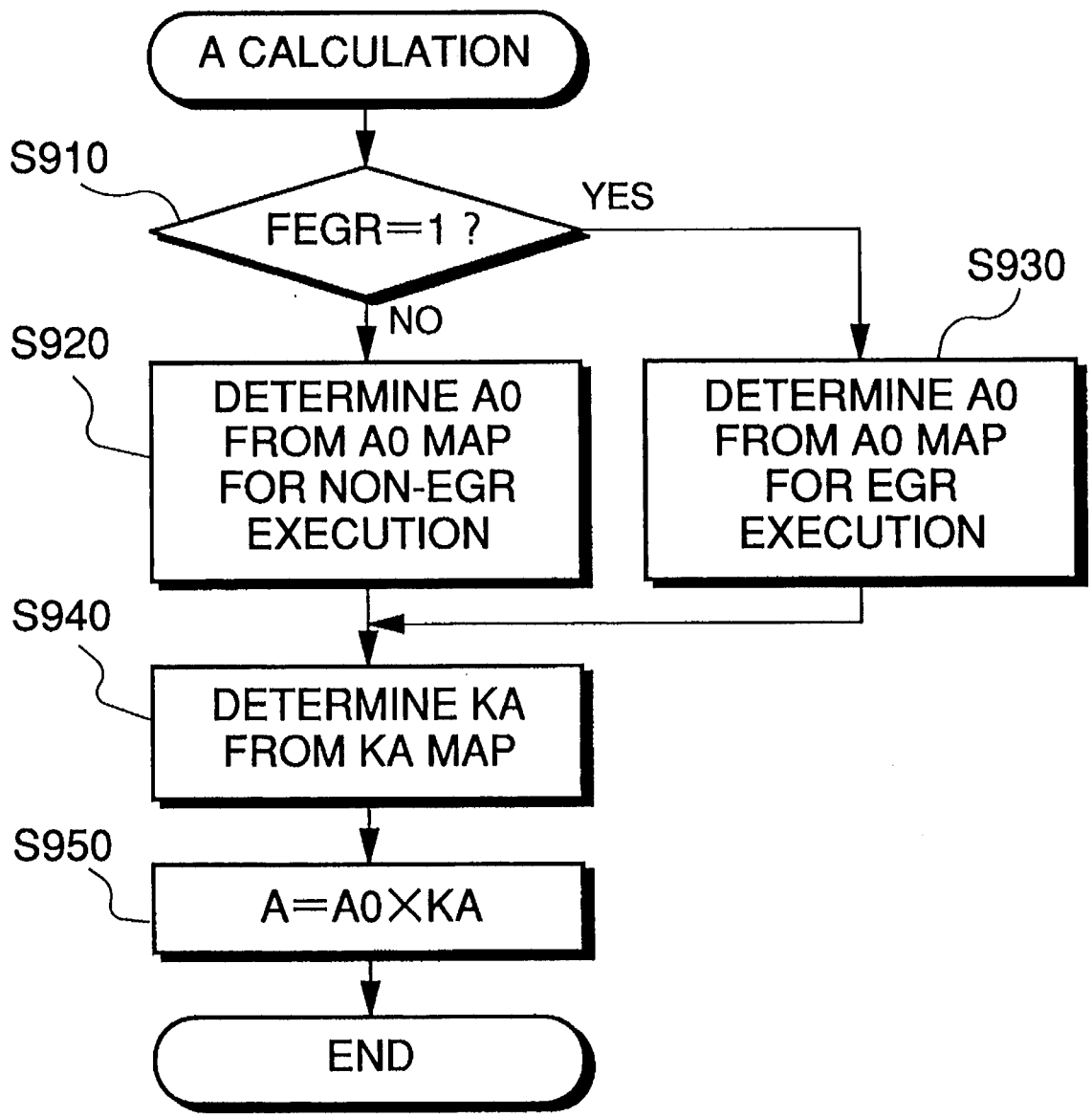
FIG. 14 is a flowchart showing a program for calculating a direct supply ratio A.

A manner of calculation of the direct supply ratio A will be described hereinafter. FIG. 14 shows a program for calculating the direct supply ratio A. First, at a step S810, it is determined whether or not execution of exhaust gas recirculation is permitted, from the flag FEGR, which is set to "1" when execution of exhaust gas recirculation is permitted. If the flag FEGR has been set to "0", which means that execution of exhaust gas recirculation is not permitted, a basic value A0 of the direct supply ratio A is determined from an A0 map for non-EGR execution, based on the engine rotational speed NE and the intake pipe absolute pressure PBA, at a step S820. If the flag FEGR has been set to "1" at the step S810, which means that execution of exhaust gas recirculation is permitted, the basic value A0 of the direct supply ratio A is determined from an A0 map for EGR execution, based on the engine rotational speed NE and the intake pipe absolute pressure PBA, at a step S830. Then, the wall temperature TC of the intake pipe 2 detected by the intake pipe wall temperature sensor 32 is read into the CPu 5b, and a correction value KA of the direct supply ratio A is determined from a KA map, based on the thus read wall temperature TC of the intake pipe 2 and the engine rotational speed NE, at a step S840. The basic value A0 is multiplied by the thus determined correction coefficient KA to obtain the direct supply ratio A, at a step S850, followed by terminating the present routine.

Calculation of time constant T

Next, a manner of calculation of the fuel transfer delay time constant T will be described. FIG. 15 shows a program for calculating the transfer delay time constant To First, at a step S910, it is determined whether or not execution of exhaust gas recirculation is permitted, from the flag FEGR, which is set to "1" when execution of exhaust gas recirculation is permitted, similarly to the program for calculating the direct supply ratio A, described hereinabove. If the flag FEGR has been reset to "0", which means that execution of exhaust gas recirculation is not executed, a basic value 1/T0 of the transfer delay ratio 1/T is determined from a 1/T0 map for non-EGR execution, based on the engine rotational speed NE and the intake pipe absolute pressure PBA, at a step S920. The transfer delay ratio 1/T is the reciprocal of the transfer delay time constant T. If the flag FEGR has been set to "0" at the step S910, which means that execution of exhaust gas recirculation is permitted, the basic value 1/T0 of the transfer delay ratio 1/T is determined from a 1/T0 map for EGR execution, based on the engine rotational speed NE and the intake pipe absolute pressure PBA, at a step S930. Then, a correction value KT for the transfer delay ratio 1/T is determined from an NE/TC map, based on the wall temperature TC of the intake pipe 2 and the engine rotational speed NE, similarly to the calculation of the direct supply ratio A, at a step S940. Further, the basic value 1/T0 is multiplied by the correction value KT, to thereby calculate the transfer delay ratio 1/T, at a step S950, followed by terminating the routine.

As described above, the fuel supply amount control system according to the invention cannot only provide similar results to those in the first embodiment described hereinbefore, but also calculate the fuel injection amount Tout to a value more appropriate to a fuel amount required by the cylinder, by calculating the fuel injection amount by additionally executing fuel adherence-dependent control by the use of the direct supply ratio A and fuel transfer delay ratio I/T of injected fuel which are calculated in dependence on whether exhaust gas recirculation is being carried out.

What is claimed is:

1. A fuel supply amount control system for an internal combustion engine having an exhaust passage, an intake passage, an exhaust gas recirculation passage extending between said exhaust passage and said intake passage, and exhaust gas recirculation valve means arranged across said exhaust gas recirculation passage, for recirculating part of exhaust gases emitted from said engine to said intake passage, comprising:

valve lift-detecting means for detecting an actual valve lift amount of said exhaust gas recirculation valve means;

operating condition-detecting means for detecting operating conditions of said engine;

desired valve lift-determining means for determining a desired valve lift amount of said exhaust gas recirculation valve means, based on operating conditions of said engine detected by said operating condition-detecting means;

exhaust gas recirculation valve control means for controlling said exhaust gas recirculation valve means, based on said desired valve lift amount determined by said desired valve lift-determining means and said actual valve lift amount detected by said valve lift-detecting means, when said engine is in a predetermined operating region where conditions for executing exhaust gas recirculation control are satisfied;

basic fuel injection-calculating means for calculating a basic fuel supply amount, based on operating conditions of said engine detected by said operating condition-detecting means;

correction coefficient-setting means for setting a correction coefficient for correcting said basic fuel supply amount, based on said actual valve lift amount and said desired valve lift amount, when said engine is in said predetermined operating region; and basic fuel amount-correcting means for correcting said basic fuel amount, based on said correction coefficient.

2. A fuel supply amount control system as claimed in claim 1, wherein said correction coefficient-setting means sets said correction coefficient, based on a degree to which said actual valve lift amount approaches said desired valve.

3. A fuel supply amount control system as claimed in claim 2, wherein said correction coefficient-setting means sets said correction coefficient, based on a ratio of said actual valve lift amount to said desired valve lift amount.

4. A fuel supply amount control system as claimed in claim 2, wherein said correction coefficient-setting means delays correction of said correction coefficient based on said degree to which said actual valve lift amount approaches said desired valve lift amount by a predetermined time period.

5. A fuel supply amount control system as claimed in claim 4, wherein said correction coefficient-setting means sets said predetermined time period, based on operating conditions of said engine.

6. A fuel supply amount control system as claimed in claim 5, wherein said correction coefficient-setting means sets said predetermined time period, based on rotational speed of said engine.

* * * * *